Dec. 26, 1939.                L. H. YOUNG                 2,185,010
                            OPTICAL COMPARATOR
                    Filed Sept. 13, 1937        3 Sheets-Sheet 1

INVENTOR
Louis H. Young.
BY
F. W. Kenway.
ATTORNEY

Dec. 26, 1939.   L. H. YOUNG   2,185,010
OPTICAL COMPARATOR
Filed Sept. 13, 1937   3 Sheets-Sheet 2

INVENTOR
Louis H. Young.
BY
ATTORNEY

Dec. 26, 1939.　　　L. H. YOUNG　　　2,185,010
OPTICAL COMPARATOR
Filed Sept. 13, 1937　　　3 Sheets-Sheet 3

INVENTOR
Louis H. Young.
BY
ATTORNEY

Patented Dec. 26, 1939

2,185,010

UNITED STATES PATENT OFFICE 2,185,010

OPTICAL COMPARATOR

Louis H. Young, Auburndale, Mass., assignor to Gillette Safety Razor Company, Boston, Mass., a corporation of Delaware Application September 13, 1937, Serial No. 163,517

13 Claims. (Cl. 88—14)

This invention relates to the inspection or testing of sharp edged blades. It consists in an optical comparator by which the uniformity of comparatively small numbers of blades forming a portion of a large group may be subjected successively to scrutiny in respect to observable characteristics, such as surface condition, color or shape of bevel, and an indication given as to these characteristics in comparison with a standard of accepted value. An important field of use for such instruments is in the testing of safety razor blades and accordingly the invention will be described in that connection, although it will be evident that many features of the invention are equally applicable to the testing of sharp edged blades wherever found and of whatever character.

When the grinding steps in producing safety razor blades have been completed the blades are subjected to tests or inspection designed to detect faults or imperfections in the edge of the blade. Apparatus for this general purpose is disclosed in United States Letters Patent of Knobel and Young No. 2,027,595 and No. 2,065,713. The apparatus of those patents is designed for investigating directly the keenness of the cutting edge, whereas, the apparatus of the present invention is designed for investigating characteristics of the bevelled surfaces forming the cutting edges. More particularly, the apparatus of the present invention is designed for investigating progressively the condition of the bevelled faces of blades presented to the apparatus in a stack and in such manner that the stack may be rapidly passed through the machine while a continuous optical indication is made of the condition of successive small groups of blades therein.

In the apparatus of my invention advantage is taken of the fact that, if a number of blades of consecutive manufacture is arranged uniformly in series and similarly illuminated in a narrow selected band or zone, any variation in the color, surface texture or angle may be detected and conspicuously indicated by optical means. While these characteristics do not directly indicate the keenness of the edge they do indicate a departure from uniformity of the whole stack and they may mean defective edges. For example, rust spots are readily detected in this manner and it is desired to discard blades impaired in that respect. A variation in color along a stack of blades indicates a variation in grinding or honing operations. The manufacturer desires to detect such blades as early as possible in the manufacturing processes and with as little inspection expense as possible.

With these objects in view the apparatus of my invention comprises a holder for maintaining a stack of blades, face to face, with their to-be-inspected edges in a common plane, a light source relatively movable with respect to the stack whereby bevelled portions of the blades may be traversed by a light beam, and means for indicating the intensity of light reflected or diffused by consecutive bevels.

Preferably and as herein shown the apparatus employs a light source and a light-sensitive cell so arranged that light emanating from the source reaches the cell by double or selective reflection, that is to say, the light beam falling upon the bevelled portion of one blade is reflected or diffused to the bevelled portion of a second blade and from it a small part of the incident rays reach the cell. Any desired form of indicator may be employed for indicating the intensity of the reflected rays. As herein shown an ammeter is employed for indicating to the operator the amount of current flowing through a light-sensitive cell under conditions of varying intensity of reflected light as the stack is traversed in a continuous manner by the light beam. Under these circumstances blades presenting off color or irregularity of bevel are at once indicated by a fluctuation of the ammeter needle and the operator is, therefore, warned that the blades under scrutiny should be discarded or subjected to further individual inspection. If, on the contrary, the ammeter reading is substantially constant while the stack is being traversed in the machine the operator is informed, at least in the respects noted, that the blades of the stack are running in uniformity.

These and other features of the invention will be best understood and appreciated from the following description of a preferred embodiment thereof, selected for purposes of illustration and shown in the accompanying drawings, in which.

Figure 7:
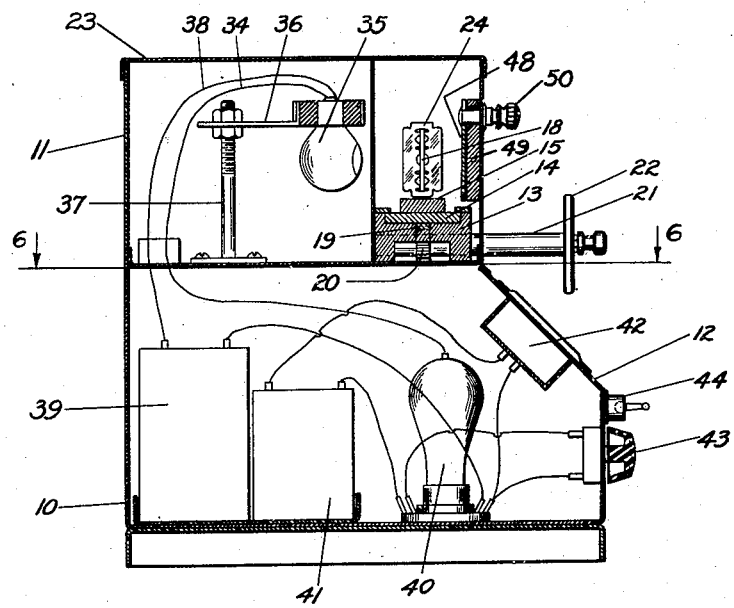
Fig. 7 is a cross-sectional view on the line 7—7 of Fig. 3.

While the apparatus may take many varied forms and its component parts may be variously arranged in accordance with the purpose for which it is intended, the construction herein illustrated comprises the best now known to me where the subject under investigation is a stack of safety razor blades. A rectangular housing 10 comprises the base of the instrument and this is provided with an upper section 11 somewhat shallower from back to front than the housing 10 and set back by an inclined instrument board 12 which comprises one wall of the housing. A horizontal track 13 extends through the upper section 11 from side to side and out beyond both walls of this section. In the track 13 is mounted a horizontally movable carriage 14 having a pair of transverse retaining bars 15 thereon which are oppositely recessed to receive the outer end of the base 16 of a holder for a stack of perforated blades. In the holder an upright standard 17 projects from the base 16 and carries a bar or blade 18 which extends horizontally above or overhanging the base 16. The blade 18 is flat and narrow, being of such dimensions that perforated razor blades may be slipped easily thereon and maintained accurately face to face in vertical position and with their bevelled edges aligned and presenting composite faces disposed in vertical planes. The holding blade 18 is at a sufficient height above the base 16 so that the lower ends of the blades in the stack 24 will clear the base 16 of the holder as suggested in Fig. 7.

Figure 3:
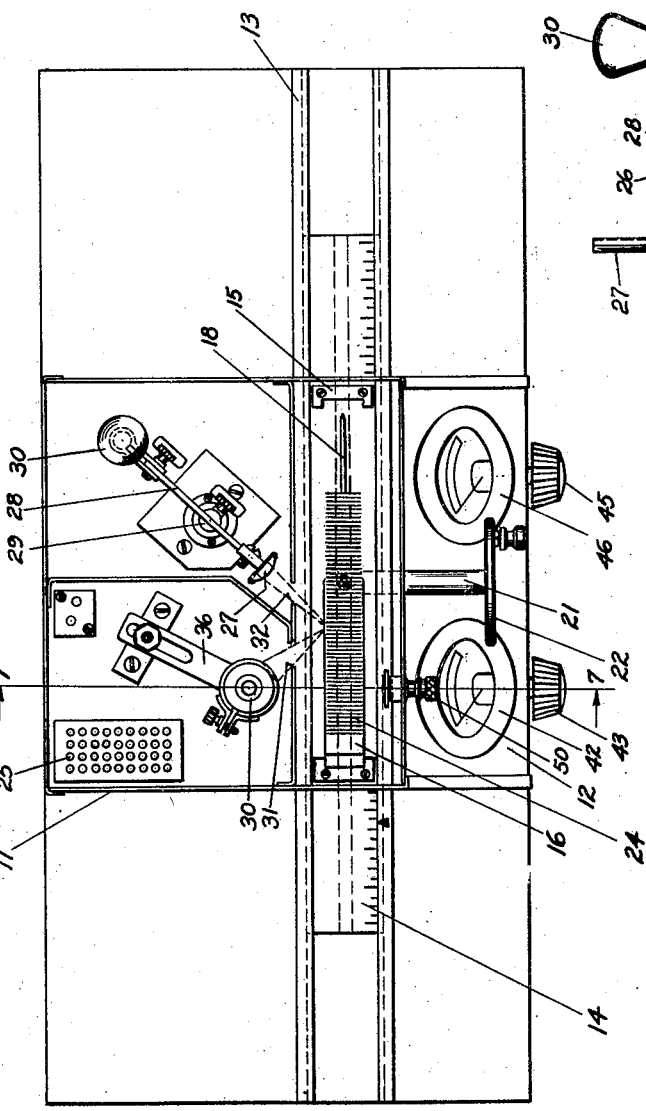
Fig. 3 is a plan view of the apparatus.

The carriage 14 is provided upon its under face with a longitudinal rack 19 and with this meshes a pinion 20 fast upon the inner end of the transverse shaft 21 which projects outwardly from the front of the instrument with a hand wheel 22 thereon by which the pinion 20 may be rotated and the carriage 14 moved freely in either direction on the track 13 by the operator. The carriage 14 is provided midway between the retaining bars 15 with an upwardly projecting stud which is arranged to interlock with the end of the base 16 of the holder. The holder may thus be easily reversed in position to bring either side of the stack into range of the light beam as will presently be described. In Fig. 3 the base 16 of the holder is shown as fitted into the left-hand retaining bar 15 so that the holding blade 18 extends toward the right as seen in this figure. It will be understood that when the carriage 14 is moved to one end or the other of its travel the blade holder may be picked-up and reversed, that is to say, the base 16 of the holder may be engaged with the right-hand retaining bar and the inner end of the base interlocked with the central stud of the carriage so that the bar or blade 18 of the holder extends toward the left thus reversing the position of the stack 24 in the instrument. The track 13 extends sufficiently to permit the carriage to be moved outside the upper section 11 of the instrument so that the operator may conveniently reverse the holder without loss of time.

The upper section 11 of the housing is divided into a long narrow front compartment through which passes the track 13 and two substantially square rear compartments. These are normally closed by a removable cover 23. The right-hand compartment of the two contains the light source unit. The left-hand rear compartment contains a photo-electric cell which is arranged to receive light rays originating in the light source and reflected by the double reflection or diffusion from the rear composite face of the blade stack 24. It also contains a perforated receptacle 25 for a drying agent, such as calcium chloride, for the purpose of keeping the photo-cell connections dry and improving its insulation in the apparatus.

The light source unit, housed in the rear right-hand compartment in the upper section 11, comprises a socket 29 in which is rotatably mounted an upright standard 26 carrying at its upper end a horizontally extending arm 28 having a longitudinally adjustable holder at its forward end for a cylindrical lens 27 disposed with its axis vertical, and an adjustable holder at its rear end in which is mounted an electric lamp 30.

Figure 6:
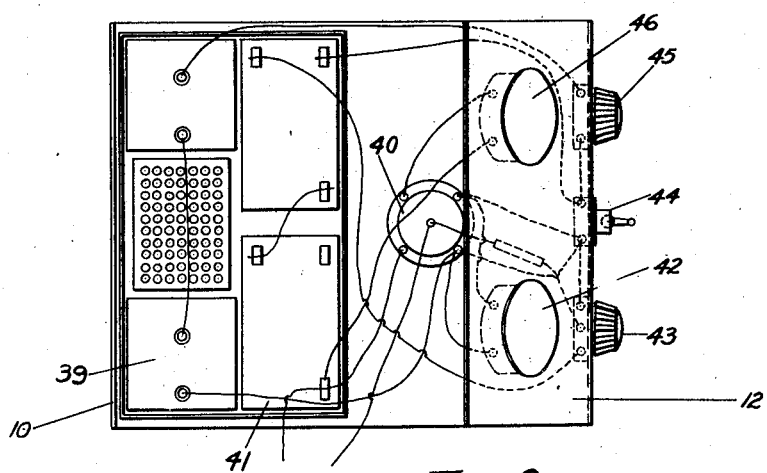
Fig. 6 is a view of the apparatus in horizontal section on the line 6—6 of Fig. 7.

The photo-electric cell 35 is mounted in the forward end of an arm 36, best shown in Fig. 6, as mounted for vertical, longitudinal and swinging adjustment about the vertically threaded standard 37. The light source is adjusted so that light emanating from the lamp 30 is collected and concentrated by the lens 27 into a narrow vertically disposed beam and this is projected through a vertical slot 32 in the rear wall of the front compartment where it may be intercepted by the composite face of the blade stack 24 in its movement through the instrument, or, if the blade stack is not located in this compartment, then the beam may encounter a standard reflecting surface formed by a glass plate 49 which is fastened to the inner face of the front wall of the front or forward compartment. However, when the machine is in use for inspecting a blade stack, a portion of the incident light is reflected rearwardly through a slot 31 in the front wall of the left-hand compartment containing the photo-electric cell 35 and it is the intensity of this reflected light which is measured and indicated while the stack is being advanced by rotation of the hand wheel 22 and is being traversed by the light beam.

Figure 1:
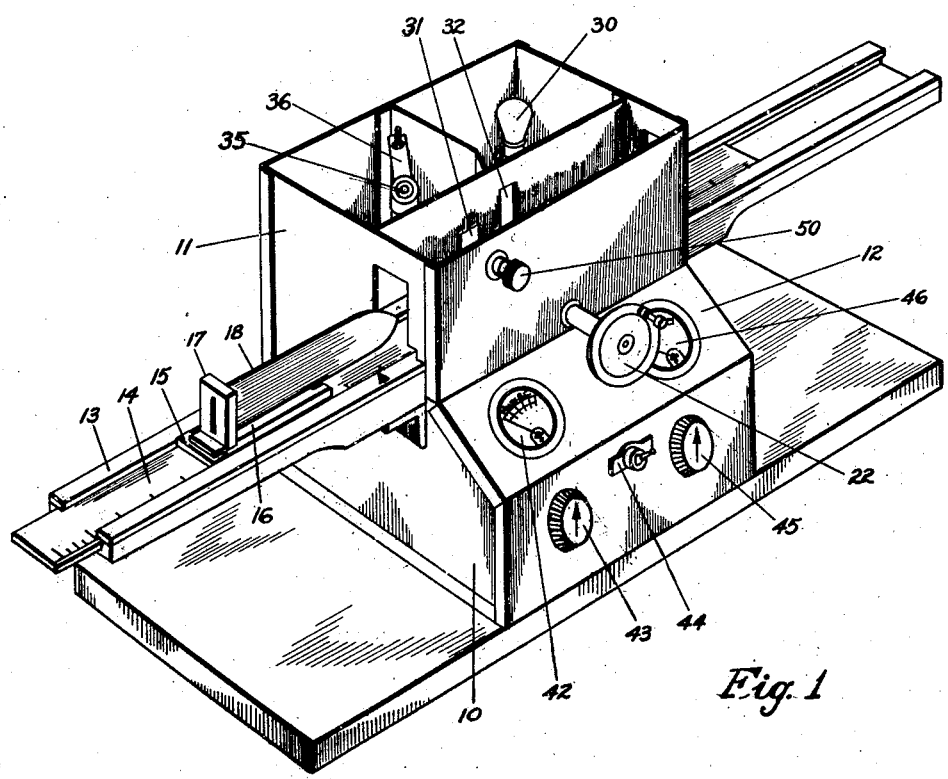
Fig. 1 is a view in perspective of apparatus embodying my invention.
Figure 2:
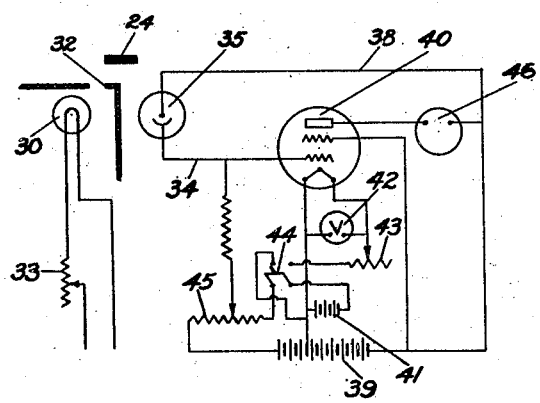
Fig. 2 is a wiring diagram of the apparatus.
Figure 5:
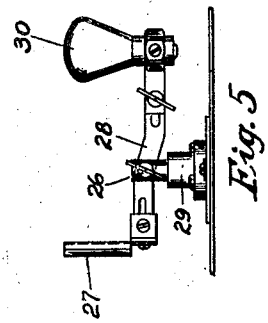
Fig. 5 is a view in elevation of the light source unit.

The measuring and indicating instrumentalities will now be more particularly described. The light source, which comprises the lamp 30 is included in a separate circuit as indicated in Fig. 2, having a rheostat 33 by which the intensity of light emitted by the lamp 30 may be controlled and regulated. The photo-electric or light-sensitive cell 35 is connected by one wire 38 to a battery 39 located within the housing 10 and by a second wire 34 to the tube 40 of an amplifier unit. It is unnecessary to describe the details of this unit more than to say that it includes any satisfactory or commercial tube and as such is effective to amplify the current of electricity flowing through the photo-electric cell circuit and fluctuating in accordance with the amount of light received from successive portions of the blade stack 24 being tested. A second battery 41 located within the housing 10 maintains the cathode of the amplifier tube at the required potential and is connected thereto through a four-pole switch 44 and rheostat 43 and volt meter 42 which is set in the instrument board 12. The anode of the amplifier tube is in circuit with a micro-ammeter 46 also set in the instrument board 12 with a rheostat 45 and the switch 44 already mentioned. By turning the knob of the rheostat 45 the amount of current flowing through the micro-ammeter may be varied by the operator as will be presently explained.

Referring again to the standard reflector, herein shown as a slab 49 of glass, it will be noted that this extends vertically upon the inner wall of the upper section 11 of the housing. It is normally covered by a depending shutter 48 carried by a stud 50. When it is desired to expose the reflector 49 for the purpose of calibrating the instrument the knob 50 is rotated to lift the shutter temporarily. The reflector may be of any suitable material. Colored Carrara glass has been found satisfactory for the purpose of reflecting the desired amount of light to serve as a convenient standard of reference.

One convenient procedure in using the instru- to test a blade stack is as follows:

The operator will first close the lamp circuit and adjust the rheostat 33 for the desired amount of illumination. He will then throw the switch 44 and adjust the rheostat 43 to get the desired potential in the filament circuit of the amplifier tube 40; for example, a potential of two volts. Thereupon the stud 50 may be turned to lift the shutter 48 and expose the standard reflector 49 so that a small fraction of the light rays emanating from the lamp 30 reaches the photo-electric cell 35. It will be noted that this light does not reach the photo-electric cell by direct reflection since the parts are not located properly for such reflection. Sufficient light is diffused by the standard reflector 49 to give a reading on the micro-ammeter 46 which is within the range of variation subsequently encountered. The rheostat controlled by the knob 45 may now be adjusted to bring the needle of the ammeter to any convenient arbitrary reading as, for example, to the mark "2" upon its scale. The stud 50 is then turned to restore the shutter 48 to its operative position in front the reflector 49 and the instrument is now ready for stack testing.

Figure 4:
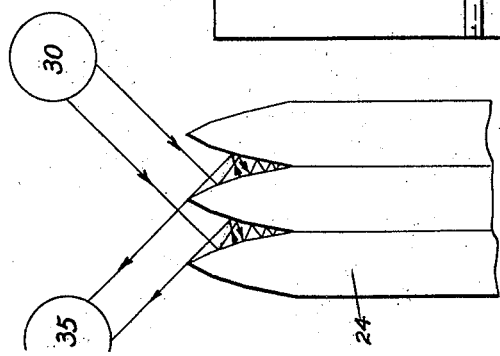
Fig. 4 is a diagrammatic view on a greatly enlarged scale indicating the path of the incident and reflected light rays.

The operator may now advance the carriage 14 to one end or the other of its travel and place a blade stack holder therein. He then turns the hand wheel 22 to move the blade stack slowly and progressively past the beam of light originating in the lamp 30 and concentrated by the lens 27 at the slit 32. In Fig. 4 is shown on a greatly enlarged scale and in plan view three of the blades constituting the blade stack 24. From this it will be noted that the bevelled edges of the blades are transversely aligned in a vertical plane. Direct light from the lamp 30 reaches the composite face of the stack presented by these bevelled edges at an angle of 45° to the axis of the stack. The bevelled face of each edge, it will be seen, is made up of three different angles. A large amount of the incident light is used up by multiple internal reflection in the reentrant angles of the bevels so that the composite face may be characterized as having low reflecting capacity. However, a small percentage of light, diffused or irregularly reflected by the incident faces of the bevels, reaches the opposite or reflecting faces of the bevels and by them is projected to the photo-electric cell 35. The amount of reflected light is small not only because of the large loss due to internal reflection but on account of the fact that since the angle of reflection is disposed at about 45° to the axis of the stack more than half of each bevelled surface is cut off from the photo-electric cell 35. In other words, it is only the outer portions of the bevelled faces which are properly located for reflection to the photo-cell and it is only a small portion of the incident light which can under any circumstances reach these portions of the bevels to be reflected. It will be seen, therefore, that only a small percentage, perhaps 2%, of the incident light is subjected to investigation by the measuring and indicating instrumentalities of the apparatus. If the stack is observed from the direction of the light source it appears to be brightly illuminated but if it is observed from the direction of the photo-electric cell it appears to be almost black.

As the blade stack is advanced across the path of the light beam the needle of the ammeter 46 will remain at rest or fluctuate slightly if the character and appearance of the bevelled edges conform uniformly to the desired standard. If, however, there is any discoloration in the bevels of the blade stack due to improper tempering, rust, or dirt there will be a violent fluctuation of the ammeter when the discolored area is brought into the path of the light beam. Moreover, if there is any variation in the angle or surface condition of bevel of the blades in the stack this is a main cause for a fluctuation of the ammeter needle. In either case the inspector is warned of a variation from the desired standard and the stack under investigation may be withdrawn for further examination of its individual blades. If, on the other hand, the stack is passed through the instrument without such warning the inspector is safe in assuming that all the blades in the stack are of uniform character and then, if one or two are individually tested for sharpness, it is safe to pass the entire stack as being up to standard.

For convenience a scale may be provided on any movable part of the carriage mechanism which, in co-operation with a stationary index mark, will indicate the portion of the stack immediately in range of the beam. As herein shown such a scale is provided on one edge of the carriage slide 14 and an index mark on one rail of the track 13.

Having thus disclosed my invention and described a preferred embodiment thereof for purposes of illustration but not in any way as limiting the invention, I claim as new and desire to secure by Letters Patent:

1. A comparator for bevel edged blades, comprising a holder having means for maintaining a stack of blades aligned in face-to-face contact with their bevelled edges presenting a composite face and a light source arranged for relative movement whereby the bevelled portions of the stacked blades may be traversed by a light beam from said source, a light sensitive cell located to receive light rays by double reflection from the bevelled portions of adjacent blades in the stack, and means for indicating the intensity of such reflection.

2. A comparator for bevel edged blades, comprising a holder for maintaining a series of blades in face-to-face contact with their bevelled edges aligned in parallel relation and presenting a composite face in the stack, means for directing a light beam so that it is reflected from one blade edge to another, and means for indicating the intensity of such reflection leaving the second edge.

3. A comparator for bevel edged blades, comprising a holder for maintaining a series of blades in face-to-face contact with their bevelled edges aligned in predetermined relation and presenting a composite face in the stack, means for directing a light beam against the bevelled edges of certain blades in the series so that it is reflected against the edges of the next adjacent blades, and means for indicating the intensity of the reflection leaving the edges of said adjacent blades.

4. An optical comparator for bevel edged blades, comprising a holder for maintaining a stack of blades side by side with their edges in a common plane and presenting a composite face of low reflecting capacity, a light source, means for relatively moving the holder and light source progressively to illuminate one side of the bevel of all the blade edges in the stack, and means for indicating the intensity of light reflected by consecutive bevels.

5. An optical comparator comprising a holder for maintaining a stack of double edge blades with their bevelled edges aligned in vertical planes and presenting composite faces in the stack, a light source, means for relatively moving the holder and light source to traverse one side or the other of the blade stack by a vertical light beam, and means for indicating the intensity of light progressively reflected by the bevels of the blades in the stack.

6. An optical comparator comprising a casing having a light source and a light-sensitive cell therein, a track extending through said casing and out on either side thereof, a carriage arranged to slide upon said track and having a horizontal bar thereon for impaling and thus holding a stack of perforated blades with their edges presenting a composite face in the stack and to present them within the casing in position to reflect light from the light source to said cell, and means for indicating the intensity of light reflected by successive portions of the composite face of the blade stack.

7. An optical comparator comprising a light-source and a holder relatively movable to traverse stacked blades in the holder by a beam from said source, a light-sensitive cell arranged to receive rays reflected by said blades, a standard reflector so located as to receive rays when not intercepted by the blades and reflect them to said light-sensitive cell, and means for indicating the intensity of such reflection.

8. An optical comparator comprising a light source, a carriage freely movable across a light beam from said source, a holder in the carriage for a stack of perforated blades, said holder comprising an arm overhanging its base and shaped to pass through the perforations of the blades to hold them in face-to-face relation and maintain them with their edges disposed in a vertical plane and presenting a composite face in the stack to receive the beam from said light source, a light-sensitive cell facing said carriage, and means associated with said cell for continuously indicating the intensity of light reflected by the blade stack and received by the cell during the movement of the carriage.

9. An optical comparator comprising a light source, means for passing a quantity of safety razor blades widthwise across a beam from said light source with the bevelled edges of the blades arranged one behind the next and presenting to the light beam a composite face of low reflecting capacity, and means for automatically and visually indicating the progressive light-reflecting characteristics of the bevels during such transit.

10. An optical comparator comprising a track, means for directing a narrow beam of light transversely across the track in a plane substantially at right angles to the plane of the track, means for advancing safety razor blades widthwise along the track and across the beam with their bevelled edges arranged one behind the next, and photo-electric means for receiving light reflected by the blades and for visually indicating the light-reflecting characteristics of the grouped bevels during such transit.

11. A device of the class described, comprising a holder for holding a stacked series of bevelled edge blades with their edges disposed in a predetermined plane and located to present to the light beam a composite face of low reflecting capacity by reason of internal reflection between the bevelled blade edges, means for directing a light beam so that it is reflected from one group of bevelled edges, mechanism for relatively moving said holder and light-directing means so that the beam is reflected by an adjacent group, and means for indicating fluctuations in the intensity of light leaving the bevels of adjacent groups as the holder and light beam are relatively moved.

12. A device of the class described comprising means for maintaining a plurality of bevelled blades accurately in stacked formation, relatively movable means for projecting light rays progressively onto the bevelled edges of the stacked blades at an angle such that the light rays are reflected back and forth between adjacent faces of the bevels so that the light reflected away from the stack of blades is reduced to a small fraction of the incident light, and photo-electric means for indicating fluctuations in the reflected light.

13. An optical comparator comprising means shaped for supporting a plurality of bevelled-edge blades in stacked relation and with their edges presenting a composite face of low reflecting capacity, means for relatively moving the stack of blades and a light source to traverse the composite face of the stack by a light beam from said source, a light sensitive cell arranged to receive rays reflected by the composite face of the blade stack, an amplifier associated with said cell, and a meter for indicating the magnitude of current flowing through the amplifier during the progress of the traversing movement.

LOUIS H. YOUNG.